US012475240B2

(12) United States Patent
Werner et al.

(10) Patent No.: US 12,475,240 B2
(45) Date of Patent: Nov. 18, 2025

(54) PROTECTED CONTENT CONTAMINATION PREVENTION

(71) Applicant: INTERNATIONAL BUSINESS MACHINES CORPORATION, Armonk, NY (US)

(72) Inventors: John S. Werner, Fishkill, NY (US); Diane Marie Stamboni, Poughkeepsie, NY (US); Elton de Souza, Scarborough (CA); Kavita Sehgal, Poughkeepsie, NY (US); Sneha Mary Varghese, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 17/820,744

(22) Filed: Aug. 18, 2022

(65) Prior Publication Data

US 2024/0061944 A1    Feb. 22, 2024

(51) Int. Cl.
*G06F 21/62* (2013.01)
*G06F 8/71* (2018.01)
(Continued)

(52) U.S. Cl.
CPC ............ *G06F 21/6209* (2013.01); *G06F 8/71* (2013.01); *G06F 21/121* (2013.01); *G06F 21/31* (2013.01); *G06F 2221/2141* (2013.01)

(58) Field of Classification Search
CPC ...... G06F 21/6209; G06F 8/71; G06F 21/121; G06F 21/31; G06F 2221/2141
See application file for complete search history.

(56) References Cited

U.S. PATENT DOCUMENTS

| 5,204,897 A | 4/1993 | Wyman |
| 6,920,567 B1 | 7/2005 | Doherty |

(Continued)

FOREIGN PATENT DOCUMENTS

CN          112804080 A  *  5/2021  ......... G06F 16/9535

OTHER PUBLICATIONS

Acoustic, "Prioritize your customer experience efforts with more speed and accuracy", Tealeaf by Acoustic, Accesses on Aug. 16, 2022, 8 Pages. Retrieved from Internet: <URL: https://acoustic.com/tealeaf>.

(Continued)

*Primary Examiner* — Linglan Edwards
*Assistant Examiner* — Saron Matthewos Worku
(74) *Attorney, Agent, or Firm* — Garg Law Firm, PLLC; Rakesh Garg; Anthony Mauricio Pallone

(57) ABSTRACT

A method, computer system, and a computer program product for protected content contamination prevention is provided. The present invention may include detecting an attempt to access a new content by a computing device. The present invention may include determining if the new content includes a protected content. The present invention may include in response to determining that the new content includes the protected content, determining if the protected content is permitted to be accessed by a user profile associated with the computing device. The present invention may include in response to determining that the protected content is not permitted to be accessed by the user profile associated with the computing device, preventing access to the protected content by the computing device.

20 Claims, 5 Drawing Sheets

(51) Int. Cl.
*G06F 21/12* (2013.01)
*G06F 21/31* (2013.01)

(56) References Cited

U.S. PATENT DOCUMENTS

| | | | |
|---|---|---|---|
| 7,552,093 B2 | 6/2009 | Levin | |
| 7,870,075 B1 | 1/2011 | Sabet | |
| 8,086,869 B2 | 12/2011 | Powell, Jr. | |
| 8,160,947 B2 | 4/2012 | Oey | |
| 8,359,655 B1 | 1/2013 | Pham | |
| 8,640,101 B2 | 1/2014 | Spurlin | |
| 8,875,301 B2 | 10/2014 | Lori | |
| 8,909,925 B2 | 12/2014 | Baskaran | |
| 2001/0042045 A1* | 11/2001 | Howard | G06Q 30/0641 705/51 |
| 2004/0168121 A1* | 8/2004 | Matz | G06F 16/84 715/255 |
| 2014/0222686 A1 | 8/2014 | Levin | |
| 2014/0366159 A1* | 12/2014 | Cohen | G06F 21/31 726/28 |
| 2017/0142076 A1* | 5/2017 | Ford | H04L 63/083 |
| 2019/0268643 A1* | 8/2019 | Raley | G06Q 20/1235 |

OTHER PUBLICATIONS

Kjellin, "Interactive Topic Modeling for Source Code Analysis," Department of Information Technology, Uppsala Universitet, Aug. 2017, 68 pgs. https://uu.diva-portal.org/smash/get/diva2:1159462/FULLTEXT01.pdf.

Kuhn, "Semantic clustering: Identifying topics in source code", Elsevier, vol. 49, Issue 3, Mar. 2007, pp. 230-243. https://www.sciencedirect.com/science/article/abs/pii/S0950584906001820.

Lildude, "Linguist" GitHub.com [online library], [accessed on Aug. 16, 2022], 6 pages, Retrieved from the Internet: <URL: https://github.com/github/linguist>.

* cited by examiner

PROTECTED CONTENT CONTAMINATION PREVENTION

BACKGROUND

The present invention relates generally to the field of computing, and more particularly to software implementation.

An independent implementation of a software technology is one that is not subject to third-party restrictions. For a software implementation to be considered independent, the implementation may not involve, be derived from, or include protected content (e.g., protected source code) owned by a third-party. Software developers may, for various reasons, view the protected source code from open-source software and/or source code from proprietary software. However, inadvertently using portions of protected source code in new independent software development projects may lead to computing resources being wasted on detecting the protected source code and replacing the protected source code with original source code in the new independent software development project.

SUMMARY

Embodiments of the present invention disclose a method, computer system, and a computer program product for protected content contamination prevention. The present invention may include detecting an attempt to access a new content by a computing device. The present invention may include determining if the new content includes a protected content. The present invention may include in response to determining that the new content includes the protected content, determining if the protected content is permitted to be accessed by a user profile associated with the computing device. The present invention may include in response to determining that the protected content is not permitted to be accessed by the user profile associated with the computing device, preventing access to the protected content by the computing device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
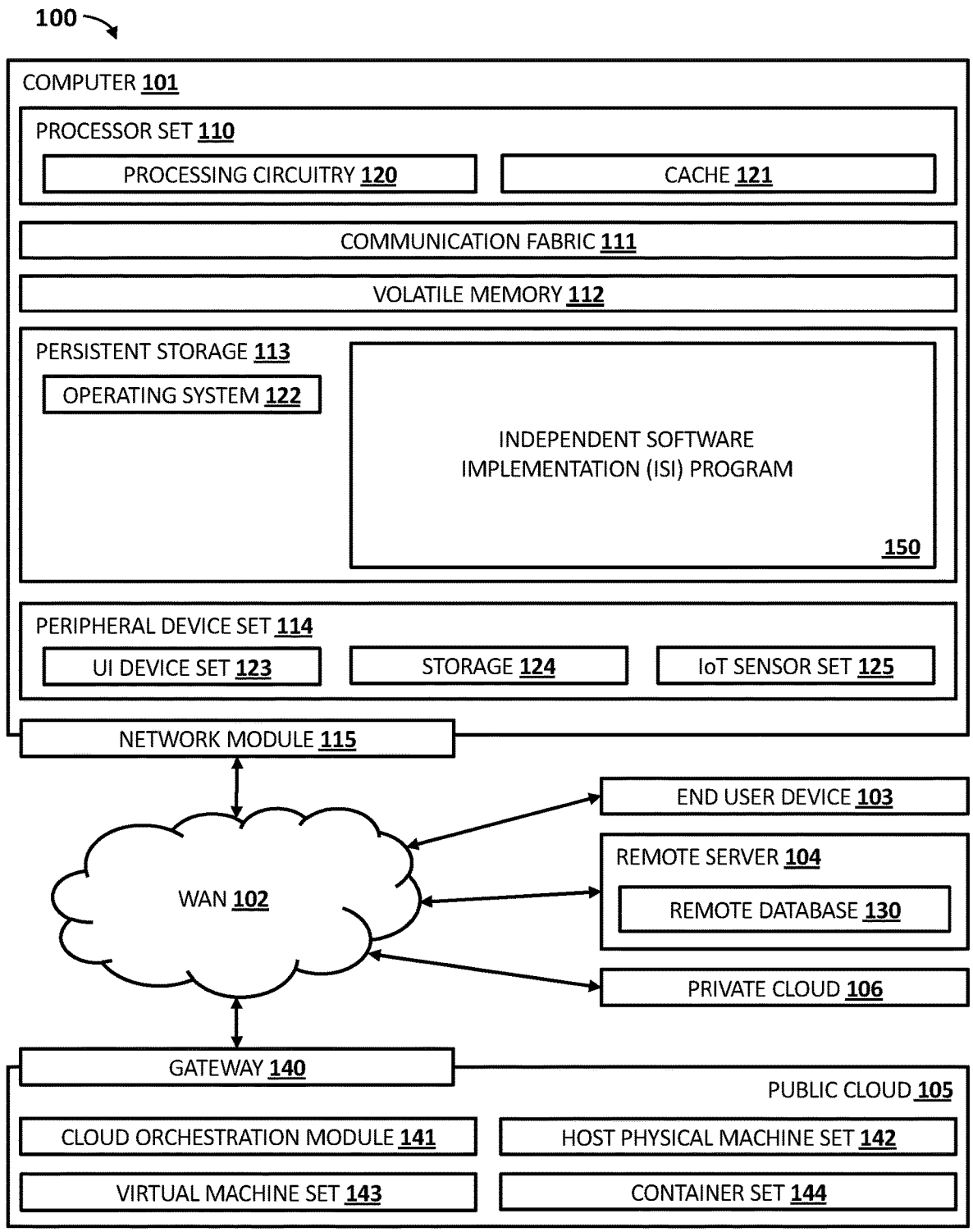
FIG. 1 illustrates a networked computing environment according to at least one embodiment.

The following described exemplary embodiments provide a system, method and computer program product for enforcing independent implementation of software. As such, the present embodiment has the capacity to improve the technical field of software implementation by ensuring that there is no conflict between content viewed by a software developer and current and/or future contributions of the software developer to similar technologies. More specifically, an independent software implementation (ISI) program may detect an attempt to access a new content by a computing device. Then, the ISI program may determine if the new content includes a protected content. Next, in response determining that the new content includes the protected content, the ISI program may determine if the protected content is permitted to be accessed by a user profile associated with the computing device. Then, in response to determining that the protected content is not permitted to be accessed by the user profile associated with the computing device, the ISI program may prevent access to the protected content by the computing device.

As described previously, an independent implementation of a software technology is one that is not subject to third-party restrictions. For a software implementation to be considered independent, the implementation may not involve, be derived from, or include protected content (e.g., protected source code) owned by a third-party. Software developers may, for various reasons, view the protected source code from open-source software and/or source code from proprietary software. However, inadvertently using portions of protected source code in new independent software development projects may lead to computing resources being wasted on detecting the protected source code and replacing the protected source code with original source code in the new independent software development project.

To prevent the inadvertent inclusion of protected content in an independent implementation, upon viewing protected content, a software developer may not work on a similar project for a specified duration of time. Tracking which software developer has viewed protected content and determining how the viewing may affect what projects the software developer may work on can be a difficult task. Concern may also lead to the software developer being restricted too broadly in the projects they can participate in, based on the content they have viewed. This can lead to uncertainties and inefficiencies when assigning software developers to projects.

Therefore, it may be advantageous to, among other things, provide a way to track activity (e.g., applications, websites, clipboard) on a computing device and check the content against current and known future work tasks prior to displaying the content on the computing device. If the content contains protected source code that conflicts with current and known future work tasks, the content may not be displayed on the computing device. If the content does not contain protected source code that conflicts with current and known future work tasks, the content may be displayed on the computing device. If the content contains protected source code, the computing device may receive a warning prior to the content being displayed and if the content is displayed on the computing device, the content viewing activity may be tracked and stored in a user account associated with the computing device. It may also be advantageous to compare the user profile to future tasks to determine if a user associated with the user profile may be allowed to work on the future tasks.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as independent software implementation (ISI) program 150. In addition to ISI program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and ISI program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, ISI program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The ISI program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the ISI program 150 to identify a computing device attempting to access new content; check, prior to displaying the content on the computing device, whether the content contains protected source code that conflicts with current and/or known future work of a user associated with the computing device; track and store viewed content in a user profile of the user if no conflicts are detected; and prevent content from being displayed on the computing device if the content may conflict with the current and/or known future work of the user associated with the computing device. Embodiments of the present disclosure are explained in more detail below with respect to FIGS. 2 to 5.

Figure 2:
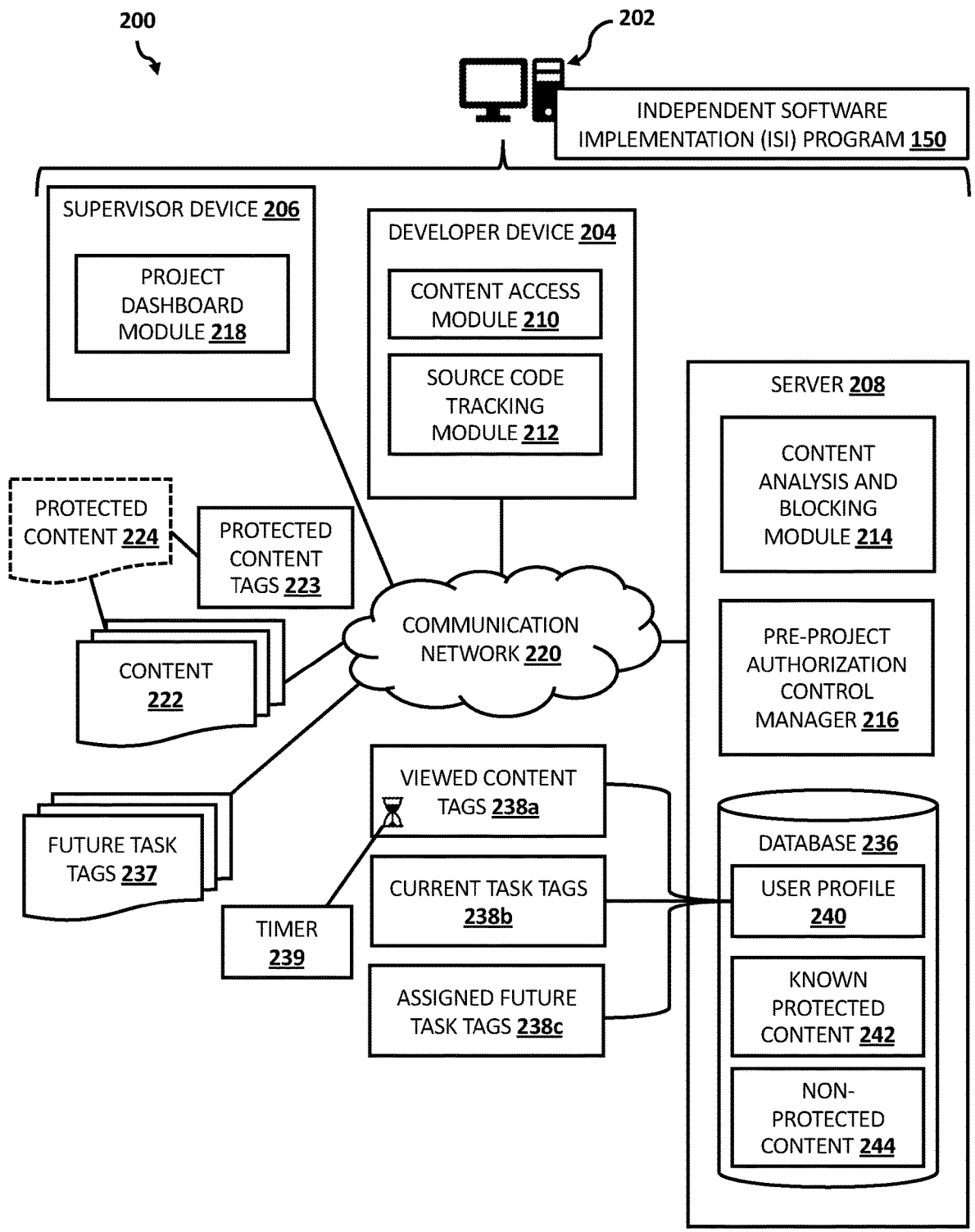
FIG. 2 is a schematic block diagram of an independent software implementation environment according to at least one embodiment.

Referring now to FIG. 2, a schematic block diagram of an independent software implementation (ISI) environment 200 according to at least one embodiment is depicted. According to one embodiment, the ISI environment 200 may include a computer system 202 having a tangible storage device and a processor that is enabled to run the independent software implementation (ISI) program 150.

Generally, the computer system 202 may be enabled by the ISI program 150 to detect protected content accessed on a user device and use that information to determine if a user associated with the user device may be allowed to work on a future project that may be related to the protected content and/or prevent the protected content from being displayed on the user device if the protected content may be related to a current project assigned to the user.

According to one embodiment, the computer system 202 may include one or more components (e.g., computer 101; end user device (EUD) 103; WAN 102) of the computer environment 100 described above with reference to FIG. 1. In one embodiment, the computer system 202 may include one or more computers (e.g., computer 101) which may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, and/or querying a database.

According to one embodiment, the computer system 202 may include at least one developer device 204 (e.g., first user device), at least one supervisor device 206 (e.g., second user device), and at least one server 208. In at least one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

In one embodiment, the ISI program 150 may include a single computer program or multiple program modules or sets of instructions being executed by the processor of the computer system 202 (e.g., developer device 204, supervisor device 206, server 208). For example, a first instance of the ISI program 150 may be implemented by the developer device 204, including at least a content access module 210 and a source code tracking module 212. Further, a second instance of the ISI program 150 may be implemented in the server 208, including at least a content analysis and blocking module 214 and a pre-project authorization control manager 216. Additionally, a third instance of the ISI program 150 may be implemented by the supervisor device 206, including at least a project dashboard module 218. In one embodiment, the ISI program 150 may include routines, objects, components, units, logic, data structures, and actions that may perform particular tasks or implement particular abstract data types. In one embodiment, the ISI program 150 may be practiced in distributed cloud computing environments where tasks may be performed by local and/or remote processing devices which may be linked through a communication network 220. In at least one embodiment, the first, second, and third instances of the ISI program 150 (e.g., the various modules) may be executed on a single computing device (e.g., developer device 204).

According to one embodiment, the developer device 204, supervisor device 206, and server 208 may be communicatively coupled via the communication network 220. The communication network 220 may include various types of communication networks, such as the wide area network (WAN) 102, described with reference to FIG. 1. In some embodiments, the WAN may be replaced and/or supplemented by a local area network (LAN), a telecommunication network (e.g., 3G, 4G, 5G), a wireless network, a public switched network and/or a satellite network. In one embodiment, the communication network 220 may enable data to be transferred between the developer device 204, supervisor device 206, and server 208 using short-range wireless technologies, such as, for example, Wi-Fi and/or Bluetooth® (Bluetooth and all Bluetooth—based trademarks and logos are trademarks or registered trademarks of Bluetooth SIG, Inc. and/or its affiliates).

According to one embodiment, the developer device 204 may be associated with a first user, such as, for example, a software developer, a programmer, and/or any other user that may contribute to the creation of a software technology. In one embodiment, the first user may include multiple developer devices 204 (e.g., laptop, tablet, smart phone) which may run the ISI program 150. The ISI program 150 may track (e.g., with permissions granted) the multiple developer devices 204 and update a user profile 240 of the first user stored in database 236 of server 208.

According to one embodiment, the content access module 210 running on the developer device 204 may detect when the developer device 204 is attempting to access (e.g., opening, clicking, launching, starting, displaying) a content 222. In one embodiment, the content 222 may include, for example, code, web pages, files, word documents, portable data format (PDF) documents, spreadsheets, and/or any other information modality which may potentially include one or more protected content 224. In one embodiment, protected content 224 may include protected source code, specifications, and/or any other documentations that may be subject to third-party restrictions (e.g., via copyright and/or licenses). For example, the protected source code may include source code from open-source software and/or source code from proprietary software.

According to one embodiment, prior to providing access (e.g., displaying) to the content 222 on the developer device 204, the ISI program 150 may execute the content analysis and blocking module 214 running on server 208 to determine if the developer device 204 should be provided access to the content 222. More specifically, the content analysis and blocking module 214 may determine if the developer device 204 should be provided access to one or more protected content 224 in the content 222.

In one embodiment, the content access module 210 may transmit the content 222 from the developer device 204 to the content analysis and blocking module 214 running on server 208. In one embodiment, the developer device 204 may send the content 222 as a link that the server 208 may open in a browser for analysis by the content analysis and blocking module 214. In another embodiment, the developer device 204 may send the content 222 as a file to the content analysis and blocking module 214 that may be opened for analysis on the server 208. In various other embodiments, the ISI program 150 may provide any suitable method to enable the content analysis and blocking module 214 to access the content 222. In at least one embodiment, the content analysis and blocking module 214 may instead be implemented in the developer device 204 to determine if the developer device 204 should be provided access to the protected content 222.

As described above, the server 208 may include the content analysis and blocking module 214 of the ISI program 150. The content analysis and blocking module 214 may be triggered by the content access module 210 and executed to analyze the content 222 that the developer device 204 is attempting to access. In one embodiment, the content analysis and blocking module 214 may compare the content 222 to current tasks and/or assigned future tasks associated with the user profile 240 of the developer device 204 to determine whether to display the content 222 on the developer device 204 or to block the developer device 204 from displaying the content 222. In one embodiment, the content analysis and blocking module 214 may also determine whether the content 222 includes protected content 224 (e.g., protected source code). Once determining that the content 222 may include protected content 224, the content analysis and blocking module 214 may compare the protected content 224 to the current tasks and/or assigned future tasks associated with the user profile 240 of the developer device 204 to determine whether to display the protected content 224 on the developer device 204 or to block the developer device 204 from displaying the protected content 224.

In one embodiment, the content analysis and blocking module 214 may execute a source code topic modeling tool to detect specific concepts and/or features in the protected content 224 which may be used to identify the topics expressed in the protected content 224. In one embodiment, the source code topic modeling tool may extract the detected concepts and/or features as one or more protected content tags 223 from the protected content 224. In one embodiment, the source code topic modeling tool may implement semantic clustering techniques to identify topics in the protected source by deriving topics from the vocabulary usage at the source code level, which may be extracted as the protected content tags 223.

According to one embodiment, the source code topic modeling tool may also be executed to analyze the current project source codes of projects that the first user is currently working on. The source code topic modeling tool may extract one or more current task tags 238b (stored in user profile 240) which may identify the concepts and/or features of the source code used in the first user's current projects. The current task tags 238b may be stored in the user profile 240 and/or the user profile 240 may include pointers to the storage location of the current task tags 238b.

In one embodiment, the content analysis and blocking module 214 may compare the protected content tags 223 (e.g., tags extracted from the protected content 224) and the current task tags 238b (e.g., tags extracted from the current projects of the first user) to determine if there is a conflict (e.g., overlapping similarity) that may warrant blocking the protected content 224 from displaying on the developer device 204. In one embodiment, the content analysis and blocking module 214 may also compare the protected content tags 223 and any assigned future task tags 238c associated with one or more future projects assigned to the first user.

In one embodiment, if the content analysis and blocking module 214 determines similarities (e.g., above a pre-determined threshold) between the protected content tags 223 and any current task tags 238b and/or assigned future task tags 238c in the user profile 240, the content analysis and blocking module 214 may output instructions (e.g., to content access module 210) to block the protected content 224 on the developer device 204.

According to one embodiment, the content analysis and blocking module 214 may directly compare the protected source code (e.g., protected content 224) recognized in the content 222 with current project source codes linked to the user profile 240. In one embodiment, the content analysis and blocking module 214 may implement any suitable code comparing techniques to determine the level of similarity between the protected source code and the current project source codes. In one embodiment, if the content analysis and blocking module 214 determines similarities (e.g., above a pre-determined threshold) between the protected source code and any current project source codes linked to the user profile 240, the content analysis and blocking module 214 may output instructions (e.g., to content access module 210) to block the protected content 224 on the developer device 204.

According to one embodiment, the content access module 210 may receive output from the content analysis and blocking module 214 to enable access (e.g., display) to the protected content 224 or block access to the protected content 224 on the developer device 204. In one embodiment, providing access to the protected content 224 may include providing access to the totality of the content 222 including the protected content 224. In one embodiment, blocking access to the protected content 224 may including blocking access to the totality of the content 222 including the protected content 224. In other embodiments, blocking access to the protected content 224 may include blocking access to the protected content 224 while providing access to the remaining, non-protected content 222 or the portion of protected content 224 that does not overlap with current or known future work tasks (e.g., by obfuscating the portion of protected source code while displaying the non-protected source code).

According to one embodiment, if the content analysis and blocking module 214 determines that the protected content 224 may be accessed by the developer device 204 (e.g., no conflict between the protected content 224 and current and/or future tasks linked to the developer device 204 by user profile 240), the ISI program 150 may activate the source code tracking module 212, as will be detailed further below.

In one or more embodiments, if the developer device 204 is allowed to access the content 222 and if the content 222 contains protected content 224 (e.g., identified by the content analysis and blocking module 214), the content access module 210 may display a warning notification on the developer device 204 prior to displaying the protected content 224 on the developer device 204. In one embodiment, the notification may include a message to the first user of the developer device 204 indicating that, if the protected content 224 is viewed on the developer device 204, the viewing activity on the developer device 204 may be tracked (e.g., by the source code tracking module 212) and stored in a user profile 240 (associated with the developer device 204/first user) on database 236. In one embodiment, the viewing activity may be stored as viewed content tags 238a, as will be discussed further below.

In one or more embodiments, if the protected content 224 is blocked, the content access module 210 may display a conflict notification on the developer device 204 indicating that a conflict was detected by the content analysis and blocking module 214 between the protected content 224 that the developer device 204 is attempting to access and the user profile 240 associated with the developer device 204.

In at least one embodiment, if the first user of the developer device 204 believes the protected content 224 may have been incorrectly blocked, the content access module 210 may enable the first user of the developer device 204 to request that a second user, who does not have conflicts with viewing the protected content 224, view the protected content 224 to provide a second opinion. In one embodiment, if the second user is a supervisor, the second user may override the blocking of protected content 224 on the developer device 204. The second user may be another developer using their own developer device 204 or a supervisor using supervisor device 206. Viewed content tags 238a may be added to the user profile of the reviewer while performing the review.

According to one embodiment, if the content analysis and blocking module 214 determines that the protected content 224 (e.g., content 222 including protected content 224) may be accessed by the developer device 204, the ISI program 150 may activate the source code tracking module 212. In one embodiment, once activated by the ISI program 150, the source code tracking module 212 may track all content 222 that is visible on the display across one or more developer devices 204 (e.g., on a web browser running on developer device 204). In one embodiment, the source code tracking module 212 may implement any suitable remote monitoring method for capturing and analyzing the content 222 that is visible on the developer device 204.

In one embodiment, if the content 222 that is displayed on the developer device 204 includes protected content 224 (e.g., protected source code), the source code tracking module 212 may extract (e.g., using the source code topic modeling tool) one or more viewed content tags 238a (e.g., identifying tags) from the protect content 224 that is displayed on the developer device 204. The source code tracking module 212 may add the extracted viewed content tags 238a to the user profile 240 within database 236. The viewed content tags 238a may be stored in the user profile 240 and/or the user profile 240 may include pointers to the storage location of the viewed content tags 238a. In one embodiment, the viewed content tags 238a may include all the protected content tags 223. In other embodiments, the viewed content tags 238a may include a subset of the protected content tags 223 corresponding to a subset of the protected content 224 that was displayed on the developer device 204.

In one embodiment, the viewed content tags 238a added to the user profile 240 may include a timer 239 that indicates a duration of time, from a timestamp of the most recent viewing of the protected content 224, that the user profile 240 may be restricted from being assigned and/or working on a future project which also includes the same or similar tags (e.g., future task tags 237) to the viewed content tags 238a. In one embodiment, the timer 239 may be automatically set from the timestamp based on a software development implementation guideline and/or company policy which indicates that a developer (e.g., the first user), upon viewing protected content 224 (e.g., open-source code software), may not contribute to other independent implementations of similar technologies for a specified duration of time. The restriction on contributing to independent implementations of similar technologies for a specified duration of time after viewing protected content 224 may ensure that developers are not inadvertently using portions of protected source code in new independent software development projects. As such, the restriction implemented by the ISI program 150 may lead to source code originality from developers and source code originality may lead to faster advancements in the field of software development.

According to one embodiment, the server 208 may also include the pre-project authorization control manager 216 of the ISI program 150. The pre-project authorization control manager 216 may take/receive one or more future task tags 237 (e.g., Secure Shell (SSH), Rivest-Shamir-Adleman (RSA), Open Secure Sockets Layer (OpenSSL)) as input and compare the future task tags 237 to the user profile 240 (e.g., viewed content tags 238a) on database 236 to determine if the first user is contaminated (e.g., conflicted) from working on a future project based on protected content 224 (e.g., protected source code) that was accessed by developer device 204 of the first user. In one embodiment, the pre-project authorization control manager 216 may generate a percentage match between the one or more viewed content tags 238a in the user profile 240 and the one or more future task tags 237 to determine if the future task tags 237 may be added to the user profile 240 (e.g., if first user may work on the future project) as assigned future task tags 238c or if first user is conflicted (e.g., contaminated) from working on the future project.

In one embodiment, the output of the pre-project authorization control manager 216 may be transmitted to the supervisor device 206 and displayed using the project dashboard module 218 of the ISI program 150. In one embodiment, the pre-project authorization control manager 216 may automatically determine the one or more user profiles 240 that may be able to work on a future project based on the comparisons generated by the pre-project authorization control manager 216.

According to one embodiment, the future task tags 237 may be generated and uploaded to the ISI environment 200 by a supervisor, manager, team leader (e.g., via supervisor device 206), and/or automatically extracted from a corpus which explains the topics and/or intentions behind the future task. In one or more embodiments, the future task tags 237 may initially be uploaded to a separate repository as a future task tag cluster or new task tag cluster (e.g., cluster of tags describing a new task).

According to one embodiment, if no conflicts (e.g., no conflicts that exceed a threshold) are detected between the future task tags 237 and the viewed content tags 238*a* associated with the user profile 240, and the future task is assigned to the first user associated with the user profile 240, the pre-project authorization control manager 216 may link the future task tags 237 to the user profile 240 as the assigned future task tags 238*c*.

In at least one embodiment, the ISI program 150 may enable the first user to add assigned future task tags 238*c* to their user profile 240 corresponding to any future projects assigned to the first user (e.g., to avoid technology conflicts). This may be helpful if the future task tags 237 uploaded by a supervisor and subsequently linked to the user profile 240 of the first user as the assigned future task tags 238*c* may not have captured all the relevant tags associated with the future project assigned to the first user.

In one or more embodiments, the content analysis and blocking module 214 may always execute (e.g., as a background process) on content (e.g., current project source codes) generated on the developer device 204 such that a conflict may be triggered in situ (e.g., real-time) if the pre-project conflict check is not performed. For example, if the first user begins working on a new project on the developer device 204 without a conflict check being performed between future task tags 237 of the new project and the user profile 240 (e.g., viewed content tags 238*a*), the content analysis and blocking module 214 may detect a conflict, in real-time (e.g., as the first user is generating the source code for the new project), between the new project that the first user is currently working on and previous protected content 224 (e.g., based on viewed content tags 238*a*) accessed (e.g., displayed on developer device 204) by the first user.

In one embodiment, the real-time conflict check performed by the content analysis and blocking module 214 may include a comparison between the viewed content tags 238*a* and the current project source code (e.g., source code of the new project the first user is currently working on). In some embodiments, the real-time conflict check performed by the content analysis and blocking module 214 may include a comparison between the viewed content tags 238*a* and the current task tags 238*b* associated with the new project the first user is currently working on. In this embodiment, the content analysis and blocking module 214 may implement the source code topic modeling tool to extract one or more current task tags 238*b* from the source code of the new project the first user is currently working on. In one or more embodiments, the real-time conflict check performed by the content analysis and blocking module 214 may include a comparison between the protected source code (e.g., protected content 224) recognized in the content 222 with current project source codes generated by the first user.

If a conflict is detected in real-time, the work of the first user may not be committed to the new project that the first user is currently working. However, by detecting the conflict in real-time, the ISI program 150 may enable a computer to save the computing resources which would have been wasted on generating, compiling, and/or testing source code which could not be committed to the new project (e.g., independent software development project). If the conflict is instead detected during an audit at the end of the project (e.g., if ISI program 150 is not implemented), in addition to the computing resources wasted on generating, compiling, and/or testing conflicting source code, additional computing resources may be needed to generate code by another user (e.g., another developer) that does not present a conflict between the viewed content tags 238*a* of that another user and the new project.

According to one embodiment, the database 236 may include an immutable ledger which may prevent tampering with the data stored therein. In one embodiment, the database 236 may contain user profiles 240 that track the protected content 224 accessed by the corresponding first user (e.g., using viewed content tags 238*a*), when the protected content 224 was last viewed (e.g., using a timestamp and timer 239), and current projects (e.g., current task tags 238*b* and/or source code that the first user is currently working on). In one embodiment, the user profiles 240 may also include and/or link to the assigned future task tags 238*c* for future projects assigned to the corresponding first user. As described previously, the timer 239 may be recorded in the user profile 240 to calculate the duration of time (e.g., from the timestamp) that the user profile 240 (e.g., first user) may be restricted from working on a future project which also includes the same or similar future task tags 237 to the viewed content tags 238*a* extracted from the protected content 224 displayed on the developer device 204. In one embodiment, the duration of time may be automatically set by the timer 239 based on an implementation guideline. In one embodiment, the viewed content tags 238*a* and/or snippets of protected source code may be removed from the user profile 240 after the duration of time has been reached.

According to one embodiment, the database 236 may also store one or more known protected content 242 (e.g., known protected source code) and/or links to the known protected content 242. In one embodiment, the content analysis and blocking module 214 may compare the content 222 against the known protected content 242 in the database 236 to determine if the content 222 includes protected content 224. In one embodiment, the known protected content 242 may include open-source software license information (e.g., General Public License) and copyright information which the content analysis and blocking module 214 may use to determine if the content 222 includes protected content 224. In one embodiment, the known protected content 242 may also include crowdsourced information from users indicating whether the user-viewed content is protected content 224. For example, the developer device 204 may display a pop-up message querying the first user to indicate if the first user is about to view protected source code. In one embodiment, the first user may need to respond to the query in the pop-up message in order to view the content 222. In one embodiment, the known protected content 242 information may be built over time using the content analysis and blocking module 214. In one embodiment, users may provide supervised learning input by flagging content as protected or not after viewing to improve content analysis and blocking module 214 recognition for future use. Viewed content tags 238a would then be added to the current user's profile and could be properly identified if the same content is accessed by others in the future.

In at least one embodiment, the database 236 may also store and/or include links to non-protected content 244 (e.g., non-protected source code from stackoverflow.com, w3schools.com, python.org). In one embodiment, the content analysis and blocking module 214 may compare the content 222 against the non-protected content 244 in the database 236 to determine if the content 222 includes non-protected content.

Figure 3:
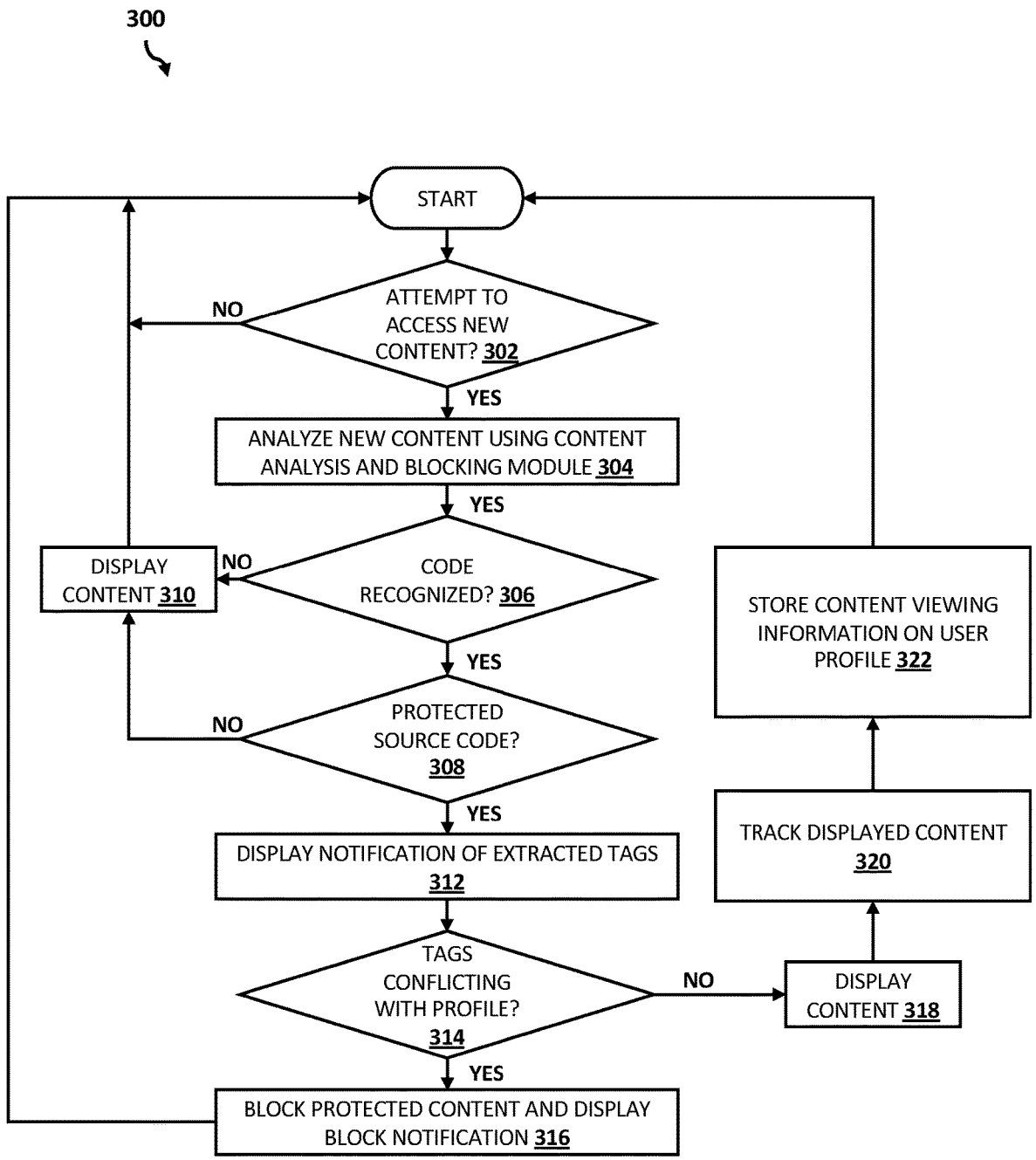
FIG. 3 is an operational flowchart illustrating a process for independent software implementation according to at least one embodiment.

Referring now to FIG. 3, an operational flowchart illustrating an exemplary process 300 used by the ISI program 150 according to at least one embodiment is depicted. FIG. 3 provides a description of process 300 with reference to the independent software implementation (ISI) environment 200 (FIG. 2).

In one embodiment, process 300 of the ISI program 150 may be executed by the developer device 204 to determine what content 222 may be accessed (e.g., displayed) by the developer device 204. In one embodiment, the process 300 may be executed by the developer device 204 to track protected content 224 that is visible on the display across one or more developer devices 204 (e.g., via a web browser). In one embodiment, the process 300 may be executed by the developer device 204 to add viewed content tags 238a (e.g., indicating the topics of visible protected source code) to the user profile 240 within database 236 including a timer 239.

At 302, a decision is made to determine if access to new content is being attempted. According to one embodiment, the ISI program 150 may detect (e.g., using the content access module 210) an attempt to access a new content 222 by a computing device, such as, for example, the developer device 204. In one embodiment, the content access module 210 may detect the attempted access by the developer device 204 by detecting the developer device 204 attempting to, for example, open, click, launch, start, and/or display the content 222.

If process 300 determines that developer device 204 is attempting to access new content 222 (e.g., attempting to open a file link or a file) (e.g., decision 302, "Yes" branch), process 300 may proceed to 304 to analyze the content 222 using the content analysis and blocking module 214. In one embodiment, the content access module 210 executing on the developer device 204 may send the content 222 (or provide a method of accessing the content) to the content analysis and blocking module 214 for analysis. In one embodiment, at block 304, the ISI program 150 may trigger process 400, as will be detailed further with reference to FIG. 4. The ISI program 150 may complete process 400 before returning and executing decision 306. In one embodiment, process 300 and process 400 may be executed substantially concurrently where process 300 (e.g., at block 304) may trigger process 400 and the analysis of process 400 may be stored and utilized (e.g., process 400 output to process 300) to execute process 300.

Then at 306, a decision is made to determine if source code is recognized in the content that the developer device is attempting to access. According to one embodiment, the content access module 210 may analyze the output of process 400 to determine if the content 222 includes source code. In one embodiment, the content analysis and blocking module 214 (e.g., using process 400) may implement any suitable source code detection techniques to determine if source code is recognized in content 222. The content analysis and blocking module 214 may output the results (e.g., source code detected, or source code not detected) to the content access module 210. As such, at decision 306, the content access module 210 may analyze the output received from the content analysis and blocking module 214 to determine if source code is recognized within the content 222.

If source code is recognized (e.g., decision 306, "Yes" branch), process 300 proceeds to 308 to determine if the recognized source code is protected source code. According to one embodiment, the content analysis and blocking module 214 (e.g., using process 400) may determine whether the recognized source code includes protected source code (e.g., protected content 224). In one embodiment, the content analysis and blocking module 214 may access the known protected content 242/non-protected content 244 in the database 236 to determine if the recognized source code in the content 222 is protected source code or non-protected source code. In one embodiment, the known protected content 242 may include open-source software license information, copyright information, and/or crowdsourced determinations of protected content information. In one embodiment, the content analysis and blocking module 214 may also check the recognized source code and/or associated source files (e.g., for license or copyright information) to determine if the recognized source code is protected source code. The content analysis and blocking module 214 may output the results (e.g., protected source code detected, or protected source code not detected) to the content access module 210. As such, at decision 308, the content access module 210 may analyze the output received from the content analysis and blocking module 214 to determine if protected source code is recognized within the content 222.

According to one embodiment, if source code is not recognized (e.g., decision 306, "No" branch) or it is determined that the source code is not protected source code (e.g., decision 308, "No" branch), process 300 moves to 310 to display the content 222 on the developer device 204. In one embodiment, 304 through 308 may be executed substantially instantaneously or concurrently (e.g., using output from process 400) such that there is no noticeable delay between the developer device 204 attempting to open the content 222 at 302 and the content 222 being displayed on the developer device 204 at 310.

However, if source code is recognized (e.g., decision 306, "Yes" branch) and it is determined that the source code is protected source code (e.g., decision 308, "Yes" branch), process 300 moves to 312 to display a notification of extracted tags. In one embodiment, the content analysis and blocking module 214 may execute a source code topic modeling tool to detect specific concepts and/or features in the protected content 224 which may be used to identify the topics expressed in the protected content 224. In one embodiment, the source code topic modeling tool may extract the detected concepts and/or features as one or more protected content tags 223 from the protected content 224. In one embodiment, the source code topic modeling tool may implement semantic clustering techniques to identify topics in the protected source by deriving topics from the vocabulary usage at the source code level, which may be extracted as the protected content tags 223. In one embodiment, the content access module 210 may receive the output (e.g., identified topics in the source code) from the content analysis and blocking module 214 as the protected content tags 223 for displaying on the developer device 204 as a notification (e.g., floating textbox; pop-up message).

Then at 314, a decision is made to determine if there are tags that conflict with the user profile. In one embodiment, the ISI program 150 may determine if the protected content 224 is permitted to be accessed by the user profile 240 associated with the developer device 204. The content access module 210 may use the output of the content analysis and blocking module 214 (e.g., from process 400) to determine if a similarity score between the protected content and at least one task (e.g., current task tags 238b and/or assigned future task tags 238c) associated with the user profile exceeds a similarity threshold. In one embodiment, the similarity score may determine if there are protected content tags 223 extracted from the protected source code that conflict with at least one task associated with the user profile 240 in database 236.

According to one embodiment, if conflicting tags are detected based on the output of the content analysis and blocking module 214 (e.g., decision 314, "Yes" branch), process 300 executes 316 to block the protected content (e.g., prevent access to protected content) and display a block notification (e.g., prevented access notification) on the developer device 204. In one embodiment, preventing access to the protected content 224 may including preventing access to the totality of the content 222 including the protected content 224. In other embodiments, preventing access to the protected content 224 may include preventing access to the protected content 224 while providing access to the remaining, non-protected content 222 (e.g., by obfuscating the portion of protected source code while displaying the non-protected source code). In one embodiment, the displayed prevented access notification may indicate the overlap between the protected content and at least one task associated with the user profile (e.g., the protected content tags 223 that conflict with the current task tags 238b and/or the assigned future task tags 238c stored in the user profile 240).

In one embodiment, the ISI program 150 may implement a low comparison threshold to determine whether to block the protected content 224 (e.g., to err on the side of caution). The ISI program 150 may also enable the comparison threshold to be changed, by for example, a supervisor of the first user using supervisor device 206.

In one or more embodiments, the content access module 210 may provide a manual override process in developer device 204 to enable the first user to challenge a conflict. As such, if the first user (e.g., user associated with developer device 204) believes a conflict may have been incorrectly identified, the developer device 204 may transmit the content 222 (e.g., including the protected content 224) and the conflict (e.g., by indicating the conflicting current task tags 238b and/or conflicting assigned future task tags 238c) to a coworker device (e.g., associated with another user or coworker with different restrictions) or supervisor device 206. That another user or supervisor may review the protected content 224 and the conflict to manually determine if the protected content 224 may be viewed by the first user on the developer device 204.

According to one embodiment, if conflicting tags are not detected based on the output of the content analysis and blocking module 214 (e.g., decision 314, "No" branch), process 300 proceeds to display content at 318 (e.g., enabling access to the new content including the protected content).

In one embodiment, prior to displaying the protected content 224, the content access module 210 may display an access notification (e.g., from 312) indicating that a content viewing information will be stored on the user profile 240, if the protected content 224 is detected as being displayed on the developer device 204 for a display duration threshold (e.g., meeting or exceeding a threshold time duration). More specifically, the access notification may include a warning indicating that, if the first user proceeds to view the protected content 224 on the developer device 204, the content viewing information may be tracked and stored. For example, the protected content tags 223 extracted from the protected content 224 may be added to the user profile 240 as viewed content tags 238a. In one embodiment, the developer device 204 may also provide an option (e.g., using source code tracking module 212) for the first user to not open (e.g., not view; not cause the developer device 204 to display) the protected content 224 such that the protected content tags 223 extracted from the protected content 224 may not be added to the user profile 240 as viewed content tags 238a.

Then at 320, a displayed content is tracked. According to one embodiment, process 300 may implement the source code tracking module 212 to track the protected source code (e.g., protected content 224) that may be displayed (e.g., visible for first user) on the developer device 204. In one embodiment, the source code tracking module 212 may also track a display duration, which may refer to a duration of time that the protected source code is visible on the developer device 204. In one embodiment, the source code tracking module 212 may track the display duration of the protected content 224 to determine if the protected content 224 was displayed on the developer device 204 for a sufficient length of time for the first user to view the protected content 224 (e.g., read the protected source-code) or if the protected content 224 was displayed on the developer device 204, briefly in passing (e.g., scrolled past the protected source-code). A display duration threshold may include one second in one or more embodiments. In at least one embodiment, the visibility duration threshold may be adjustable.

Then at 322, a content viewing information is stored on the user profile. According to one embodiment, the ISI program 150 may store content viewing information that identifies the protected content displayed on the developer device 204. According to one embodiment, the source code tracking module 212 may determine the portions of the protected content 224 (e.g., protected source code) that were displayed on the developer device 204 for longer than the display duration threshold (e.g., one second). In one embodiment, the source code tracking module 212 may then select the protected content tags 223 associated with the portions of the protected content 224 that were displayed on the developer device 204 for longer than the display duration threshold. In one embodiment, the source code tracking module 212 may then add those selected protected content tags 223 as viewed content tags 238a to the user profile 240.

In one embodiment, the source code tracking module 212 may add the timer 239 to the stored content viewing information (e.g., viewed content tags 238a). As previously described, the timer 239 may track a duration of time that the user profile 240 may be prevented from accessing (e.g., being assigned) a future task that exceeds a similarity threshold with the protected content displayed on the developer device 204 (e.g., overlap between future task tags 237 and viewed content tags 238a).

In one embodiment, the timer 239 may be automatically set from the timestamp based on a software development implementation guideline and/or company policy which indicates that a developer (e.g., the first user), upon viewing protected content 224 (e.g., open-source code software), may not contribute to other independent implementations of similar technologies for a specified duration of time. In one embodiment, the viewed content tags 238*a* may be automatically removed from the user profile 240 once the associated timer 239 has run out.

According to another embodiment, the source code tracking module 212 may add all of the protected content tags 223 (e.g., extracted from the protected content 224) to the user profile 240 regardless of whether the protected content 224 was displayed on the developer device 204 for longer than the display duration threshold. In one or more embodiments, the source code tracking module 212 may store snippets or full portions of the protected content 224 (e.g., protected source code) rather than just the extracted viewed content tags 238*a*.

According to one embodiment, if process 300 determines that the developer device 204 is not attempting to access new content (decision 302 "No" branch) or after executing blocks 310, 316, or 322, process 300 may loop back to the start to continuously monitor the developer device 204 to track and block protected content 224 if required.

Figure 4:
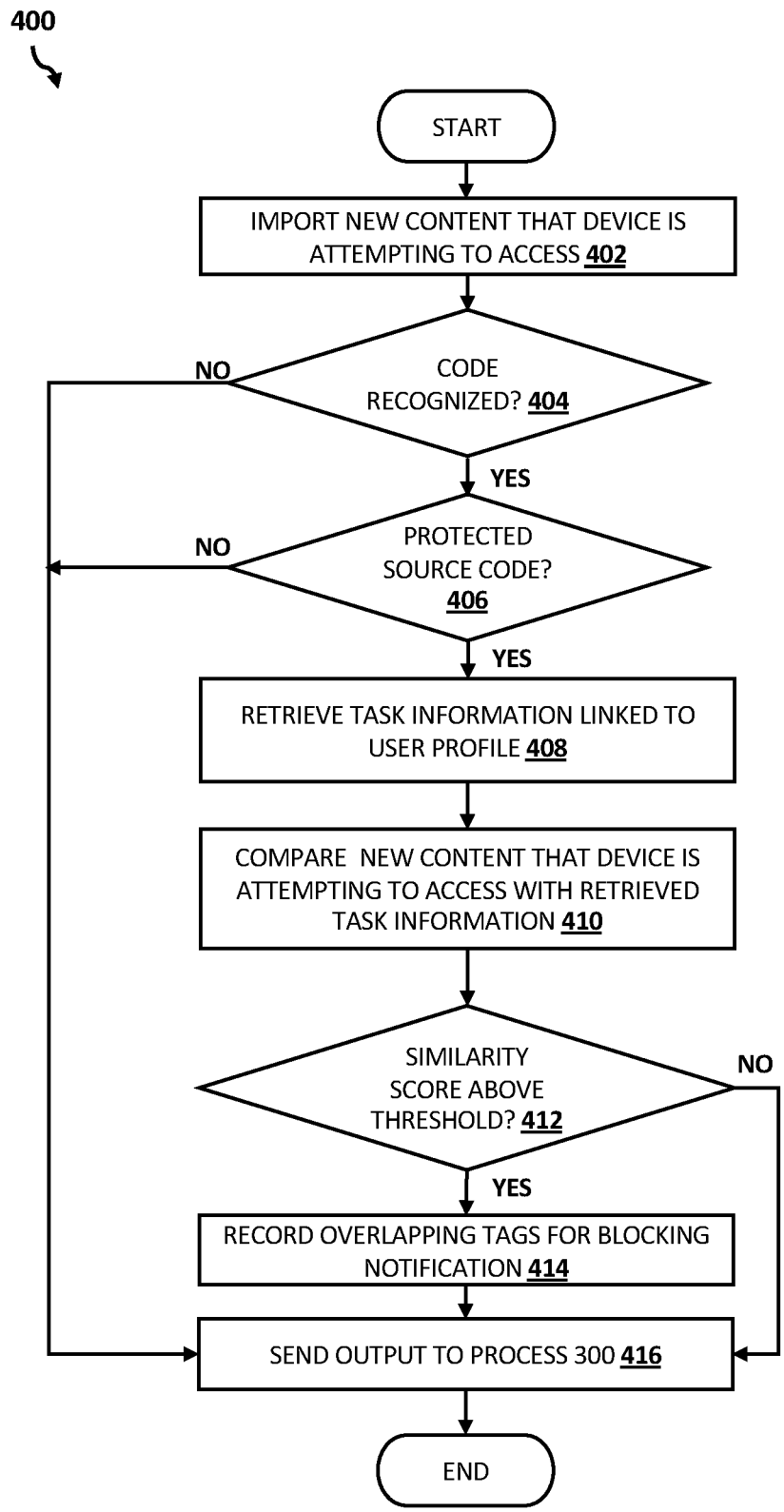
FIG. 4 is an operational flowchart illustrating another process for independent software implementation according to at least one embodiment.

Referring now to FIG. 4, an operational flowchart illustrating an exemplary process 400 used by the ISI program 150 according to at least one embodiment is depicted. FIG. 4 provides a description of process 400 with reference to the independent software implementation (ISI) environment 200 (FIG. 2) and process 300 (FIG. 3).

According to one embodiment, process 400 may be executed by the content analysis and blocking module 214 of the ISI program 150 on server 208. In one embodiment, the content analysis and blocking module 214 may perform content analysis to determine whether the content 222 should be blocked or displayed on the developer device 204. In at least one embodiment, process 400 may instead be executed by the content analysis and blocking module 214 of the ISI program 150 on the developer device 204. In such embodiments, process 300 and process 400 may both be executed on the developer device 204. According to one embodiment, process 400 may be triggered in block 304 of process 300 and may be completed (or substantially completed) before returning to execute the remainder of process 300.

At 402, new content that a device is attempting to access is imported. In one embodiment, the developer device 204 may send the content 222 as a link that the server 208 may open in a browser for analysis by the content analysis and blocking module 214. In another embodiment, the developer device 204 may send the content 222 as a file to the content analysis and blocking module 214 that may be opened for analysis on the server 208. In various other embodiments, the ISI program 150 may provide any suitable method to enable the content analysis and blocking module 214 to access the content 222.

Then at 404, a decision is made to determine if source code is recognized in the content that the developer device is attempting to access. According to one embodiment, the content analysis and blocking module 214 may implement any suitable source code detection techniques to determine if source code is recognized in content 222. As described previously with reference to process 300 (FIG. 3), the content analysis and blocking module 214 may output the results (e.g., source code detected, or source code not detected) to the content access module 210 and the content access module 210 may use the output received from the content analysis and blocking module 214 to determine if source code is recognized within the content 222.

If source code is recognized (e.g., decision 404, "Yes" branch), process 400 proceeds to 406 to determine if the recognized source code is protected source code. According to one embodiment, the content analysis and blocking module 214 may determine whether the recognized source code includes protected source code (e.g., protected content 224) using the process described previously with reference to FIGS. 2 and 3. In one embodiment, the protected source code may refer to source code that is subject to third-party restrictions (e.g., using copyrights and/or licenses).

According to one embodiment, if source code is not recognized (e.g., decision 404, "No" branch) or it is determined that the source code is not protected source code (e.g., decision 406, "No" branch), process 400 moves to 416 to send an output to the device attempting to access the new content indicating that the new content 222 does not include source code or the source code is not protected source code. Such outputs from process 400 (e.g., no source code detected or detected source code is not protected source code) may instruct process 300 to execute block 310 to display the content 222 on the developer device 204.

However, if source code is recognized (e.g., decision 404, "Yes" branch) and it is determined that the source code is protected source code (e.g., decision 406, "Yes" branch), process 400 moves to 408 to retrieve at least one task information linked to the user profile. In one embodiment, retrieving the at least one task information may include the process 400 retrieving one or more tags (e.g., current task tags and/or future task tags) linked to the user profile. In one embodiment, retrieving the at least one task information may include the process 400 retrieving, from the user profile 240 on database 236, content that the first user is currently working (e.g., current project source codes).

Then at 410, the new content that the device is attempting to access is compared with the retrieved task information. According to one embodiment, process 400 may execute comparison at block 410 between the content that the developer device 204 is attempting to open (imported at block 402) and the retrieved at least one task information from user profile 240 at block 408. In some embodiments, retrieving the tags may also include retrieving any source codes (e.g., current project source codes) linked to the user profile 240. In one embodiment, block 410 may output a similarity score (e.g., similar to a plagiarism checker) indicating the similarity (e.g., overlap) between the protected content and at least one task (e.g., tags and/or source code) associated with the user profile. In one embodiment, the similarities may be compared between the protected content tags 223 and the current task tags 238*b* and/or assigned future task tags 238*c* associated with the user profile 240. In at least one embodiment, the similarities may be compared between the protected source codes recognized in the protected content 224 and the current project source codes.

If code is not recognized anywhere within the content 222 (e.g., decision 404, "No" branch), a comparison may not need to be performed at 410 and decision 306 of process 300 may take the "No" branch, as described previously. In one embodiment, the comparison at 410 may only be performed if source code is recognized at 404, and process 400 determines that the source code is protected source code at 406 or process 400 is not able to determine if the source code is protected source code.

Then at 412, a decision is made to determine if a similarity score is above a similarity threshold. It is contemplated that situations may exist where users may include important keywords in their source code, but the source code may not be part of the development of those classes, functions, and/or methods. For example, a user may call a Secure Shell (SSH) function within their current project source code, but that should not prevent the developer device 204 associated with the user from opening content 222 with SSH protected source code if they are not developing the SSH function.

According to one embodiment, if the similarity score is above a similarity threshold (e.g., decision 412, "Yes" branch), the process 400 proceeds to 414 to record one or more overlapping tags for a blocking notification. In one embodiment, the content analysis and blocking module 214 may record any overlapping tags between the protected content tags 223 and the current task tags 238*b* and/or the assigned future task tags 238*c* associated with the user profile 240. In one embodiment, the content analysis and blocking module 214 may generate and store a prevented access notification indicating the overlapping (e.g., conflicting) tags for outputting to process 300.

According to one embodiment, after executing decision 414 or if the similarity score is below the similarity threshold (decision 412, "No" branch), process 400 moves to block 416 to send one or more outputs to process 300. In one embodiment, if protected source code (e.g., protected content tags 223) is detected that does not overlap with the user profile 240, process 400 may still generate and record a notification including one or more extracted protected content tags 223. As such, the developer device 204 may display an access notification, generated in process 300, to inform the first user of what the first user is about to view (e.g., protected content 224 associated with protected content tags 223). The first user may use this information, within process 300, to determine if they want to proceed to view the protected content 224 and have the protected content tags 223 added to their user profile 240 as viewed content tags 238*a*.

Figure 5:
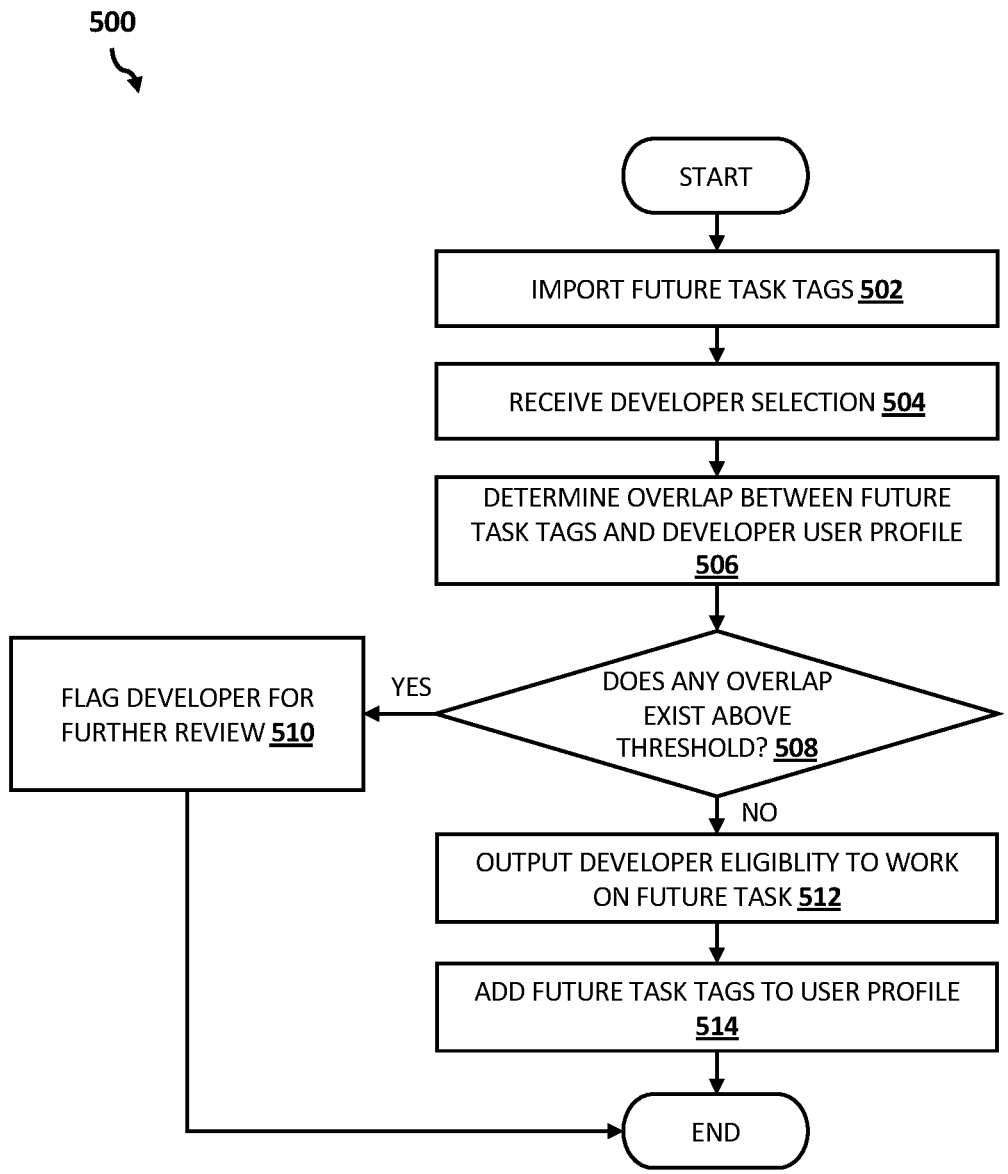
FIG. 5 is an operational flowchart illustrating a further process for independent software implementation according to at least one embodiment.

Referring now to FIG. 5, an operational flowchart illustrating an exemplary process 500 used by the ISI program 150 according to at least one embodiment is depicted. FIG. 5 provides a description of process 500 with reference to the independent software implementation (ISI) environment 200 (FIG. 2), process 300 (FIG. 3), and process 400 (FIG. 4).

According to one embodiment, process 500 may be executed by the pre-project authorization control manager 216 of the ISI program 150 on server 208. In one embodiment, the pre-project authorization control manager 216 may be executed to determine if a user is contaminated from working on a future task based on protected source content 224 (e.g., protected source code) that the user has previously accessed by generating a percentage match to a cluster of tags for a future task.

At 502, one or more future task tags are imported. According to one embodiment, the pre-project authorization control manager 216 may receive one or more future task tags 237 associated with a future task or project which may need to be assigned. In one embodiment, the future task tags 237 may be generated and uploaded by a task assignor (e.g., supervisor) associated with the future task. However, in some embodiments, the task assignor or manager may not have the technical expertise to generate a set of tags describing the topics and intentions behind the future task. As such, in at least one embodiment, the future task tags 237 may be automatically extracted from a large corpus that describes the future task. In one embodiment, natural language processing may be used to extract the important future task tag cluster from the large corpus. The corpus may be generated from crowdsourced data of previous code written in similar categories (e.g., many different programs, classes, methods, functions, etc. related to SSH may be utilized to generate a corpus of SSH related tags.

Then at 504, a developer selection is received. In one embodiment, the task assignor may select a desired developer for the task using the supervisor device 206. In one or more embodiments, process 500 may enable the task assignor to select multiple candidates and the process 500 (e.g., using pre-project authorization control manager 216) may iterate through all of the candidates to determine if any of the candidates can work on the future task and which candidate user profile 240 has the lowest percentage match to the cluster of future task tags 237. In at least one embodiment, the pre-project authorization control manager 216 may automatically recommend one or more candidate developers based on skillsets and experience (e.g., determined from the user profile 240). In at least one embodiment, the pre-project authorization control manager 216 may concurrently analyze multiple candidate developer user profiles and automatically recommend the candidate developer with the target skillsets and experience for the future task and with the lowest percentage match between the candidate developer's user profile 240 and the cluster of future task tags 237.

Next at 506, any overlap between the future task tags and the user profile of the developer is determined. In one embodiment, process 500 may compare a future task with the content viewing information (e.g., viewed content tags 238*a*) stored on the user profile to determine if the user profile can access (e.g., perform) the future task based on the protected content previously displayed on the developer device 204 associated with the user profile 240. More specifically, the pre-project authorization control manager 216 may access the developer's user profile 240 on database 236 to determine a percentage overlap (e.g., similarity score) between the viewed content tags 238*a* and the future task tags 237. In one or more embodiments, a bag-of-words model may be used where the union between the two sets may be determined, as indicated by Equation 1 below:

$$BoW_{overlap} = BoW_{future\ task} \cup BoW_{user\ profile} \quad [\text{Eq. 1}]$$

In at least one embodiment, stemming and Word2Vec may be used when determining the percentage overlap (e.g., similarity score) to account for inflected words and words with similar meaning.

Then at 508, a decision is made to determine if any overlap exists above a threshold. According to one embodiment, process 500 may determine if the overlap (e.g., calculated as percentage overlap or similarity score) between the viewed content tags 238*a* and the future task tags 237 exceeds an overlap threshold. A threshold may be implemented because some keywords or terms may overlap between source codes for different purposes and may not preclude a developer from working on the future task. In one embodiment, the overlap threshold may be set to a low threshold percentage (e.g., 10%). In some embodiments, the overlap threshold may be set to 0% overlap. In at least one embodiment, the overlap threshold may be adjustable for various tasks.

According to one embodiment, if overlap is detected above the overlap threshold percentage (e.g., decision 508, "Yes" branch), process 500 moves to 510 and flags the user (e.g., developer) for further review. As stated earlier, some terms overlap between code for different purposes that may not preclude a developer from working on a new task so a deeper dive may be needed if there is a strong desire for a specific developer to work on a specific task. However, in one or more embodiments, further review may not be performed, and the pre-project authorization control manager 216 may prevent assignment of the future task to the user profile that exceeds the overlap threshold, and the task assignor may look for another developer who does not exceed the overlap threshold for the future task.

According to one embodiment, if overlap is not detected above the overlap threshold percentage (e.g., decision 508, "No" branch), process 500 executes 512 and outputs a notification indicating a developer's eligibility to work on the future task. In one embodiment, the pre-project authorization control manager 216 may output the developer eligibility notification to the supervisor device 206.

Then at 514, the future task tags are added to the user profile if selected to perform the future task. According to one embodiment, once the developer is selected for the future task, the pre-project authorization control manager 216 may add the future task tags 237 as assigned future task tags 238c to the user profile 240 associated with the selected developer. The assigned future task tags 238c associated with the user profile 240 may ensure that the developer does not view protected source code that may prevent the developer from working on the future task. For example, protected content 224 including protected content tags 223 that may overlap with the assigned future task tags 238c may be blocked on the developer device 204 by the content analysis and blocking module 214. After executing 510 or 514, the process 500 ends.

It is contemplated that the ISI program 150 may provide several advantages and/or improvements to the technical field of software development. For example, the ISI program 150 may help ensure higher quality deliverables by preventing contamination from non-approved sources. The ISI program 150 may enable quicker audits/compliance of codebases as there is provable pedigree of source code with no external contamination involved. The ISI program 150 may ensure faster time to market for technical products as there is less manual process needed to vet the sources used in an independent software implementation. The ISI program 150 may also ensure code originality which may lead to technical advancements in the field of software development. The ISI program 150 may also improve the functionality of a computer because the ISI program 150 may enable the computer to detect conflicting source codes in real-time. As such, the ISI program 150 may enable the computer to save the computing resources which would have been wasted on generating, compiling, and/or testing conflicting source code which could not be committed to an independent software development project.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting an attempt to display a new source code content on a computing device;
   determining if the new source code content includes a protected source code;
   in response to determining that the new source code content includes the protected source code, determining if the protected source code is permitted to be accessed by a user profile associated with the computing device based on an overlap between the protected source code and at least one software development project associated with the user profile, by
      performing a source code topic modeling on the new source code and extracting a topic expressed in a vocabulary of the new source code;
      comparing a tag associated with the topic with at least one of a current task tag and a future task tag associated with a user profile; and
   in response to determining that the protected source code is not permitted to be accessed by the user profile associated with the computing device based on the overlap determined between the protected source code and the at least one software development project associated with the user profile, preventing display of the protected source code on the computing device.

2. The computer-implemented method of claim 1, further comprising:
   displaying a prevented access notification on the computing device including text that indicates the overlap between the protected source code and the at least one software development project associated with the user profile.

3. The computer-implemented method of claim 1, further comprising:
   in response to determining that the protected source code is permitted to be accessed by the user profile associated with the computing device, enabling access to the new source code content including the protected source code by the computing device.

4. The computer-implemented method of claim 3, further comprising:
   displaying an access notification on the computing device indicating that a content viewing information will be stored on the user profile associated with the computing device, responsive to detecting the protected source code being displayed on the computing device.

5. The computer-implemented method of claim 3, further comprising:
   in response to detecting the protected source code being displayed on the computing device, storing a content viewing information on the user profile associated with the computing device, wherein the stored content viewing information identifies the protected source code displayed on the computing device.

6. The computer-implemented method of claim 5, further comprising:
   storing the content viewing information that identifies the protected source code on the user profile, responsive to determining the protected source code being displayed on the computing device for a display duration threshold.

7. The computer-implemented method of claim 5, wherein the stored content viewing information includes a timer that tracks a duration of time that the user profile will be prevented from accessing a future software development project that exceeds a similarity threshold with the protected source code displayed on the computing device.

8. The computer-implemented method of claim 1, wherein determining if the new source code content includes the protected source code further comprises:
    determining that the protected source code is selected from a group consisting of open-source code software and proprietary software source code.

9. The computer-implemented method of claim 1, wherein determining if the protected source code is permitted to be accessed by the user profile associated with the computing device further comprises:
    determining if a similarity score between the protected source code and the at least one software development project associated with the user profile exceeds a similarity threshold.

10. The computer-implemented method of claim 1, further comprising:
    comparing a future software development project with a content viewing information stored on the user profile to determine if the user profile can perform the future software development project based on the protected source code previously displayed on the computing device associated with the user profile; and
    in response to determining an overlap between the future software development project and the content viewing information stored on the user profile, preventing an assignment of the future task to the user profile.

11. A computer system for protected content contamination prevention, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    detecting an attempt to display a new source code content on a computing device;
    determining if the new source code content includes a protected source code;
    in response to determining that the new source code content includes the protected source code, determining if the protected source code is permitted to be accessed by a user profile associated with the computing device based on an overlap between the protected source code and at least one software development project associated with the user profile, by
        performing a source code topic modeling on the new source code and extracting a topic expressed in a vocabulary of the new source code;
        comparing a tag associated with the topic with at least one of a current task tag and a future task tag associated with a user profile; and
    in response to determining that the protected source code is not permitted to be accessed by the user profile associated with the computing device based on the overlap determined between the protected source code and the at least one software development project associated with the user profile, preventing display of the protected source code on the computing device.

12. The computer system of claim 11, further comprising: displaying a prevented access notification on the computing device including text that indicates the overlap between the protected source code and the at least one software development project associated with the user profile.

13. The computer system of claim 11, further comprising:
    in response to determining that the protected source code is permitted to be accessed by the user profile associated with the computing device, enabling access to the new source code content including the protected source code by the computing device.

14. The computer system of claim 13, further comprising:
    displaying an access notification on the computing device indicating that a content viewing information will be stored on the user profile associated with the computing device, responsive to detecting the protected source code being displayed on the computing device.

15. The computer system of claim 13, further comprising:
    in response to detecting the protected source code being displayed on the computing device, storing a content viewing information on the user profile associated with the computing device, wherein the stored content viewing information identifies the protected source code displayed on the computing device.

16. The computer system of claim 15, further comprising:
    storing the content viewing information that identifies the protected source code on the user profile, responsive to determining the protected source code being displayed on the computing device for a display duration threshold.

17. The computer system of claim 15, wherein the stored content viewing information includes a timer that tracks a duration of time that the user profile will be prevented from accessing a future software development project that exceeds a similarity threshold with the protected source code displayed on the computing device.

18. The computer system of claim 11, wherein determining if the protected source code is permitted to be accessed by the user profile associated with the computing device further comprises:
    determining if a similarity score between the protected source code and the at least one software development project associated with the user profile exceeds a similarity threshold.

19. The computer system of claim 11, further comprising:
    comparing a future software development project with a content viewing information stored on the user profile to determine if the user profile can perform the future software development project based on the protected source code previously displayed on the computing device associated with the user profile; and
    in response to determining an overlap between the future software development project and the content viewing information stored on the user profile, preventing an assignment of the future task to the user profile.

20. A computer program product for protected content contamination prevention, comprising:
    one or more computer-readable storage media and program instructions collectively stored on the one or more computer-readable storage media, the program instructions executable by a processor to cause the processor to perform a method comprising:
    detecting an attempt to display a new source code content on a computing device;
    determining if the new source code content includes a protected source code;
    in response to determining that the new source code content includes the protected source code, determining if the protected source code is permitted to be accessed by a user profile associated with the computing device based on an overlap between the protected source code and at least one software development project associated with the user profile, by performing a source code topic modeling on the new source code and extracting a topic expressed in a vocabulary of the new source code;

comparing a tag associated with the topic with at least one of a current task tag and a future task tag associated with a user profile; and in response to determining that the protected source code is not permitted to be accessed by the user profile associated with the computing device based on the overlap determined between the protected source code and the at least one software development project associated with the user profile, preventing display of the protected source code on the computing device.

* * * * *